United States Patent [19]

Feng

[11] Patent Number: 5,100,206
[45] Date of Patent: Mar. 31, 1992

[54] AUTOMOBILE WHEEL COVER ABLE TO DISPLAY TIRE PRESSURE

[76] Inventor: Le Jan Feng, 1fl., No. 22-10, Lane 50, Tien Mu E. Rd., Taipei, Taiwan

[21] Appl. No.: 492,662

[22] Filed: Mar. 13, 1990

[51] Int. Cl.$^5$ ............................................. B60B 7/00
[52] U.S. Cl. .............................. 301/37 R; 301/5 VH; 73/146.8
[58] Field of Search ......... 301/37 R, 108 R, 108 TW, 301/5 VH; 152/418, 427, 428; 137/223, 227; 73/700, 714, 146.8; 73/700, 714, 146.8

[56] References Cited

U.S. PATENT DOCUMENTS

| | | | |
|---|---|---|---|
| 2,020,885 | 11/1935 | Gatta | 301/37 TP |
| 2,612,931 | 10/1952 | Orlicki, Jr. | 301/108 R X |
| 3,208,425 | 9/1965 | Jousma et al. | 73/146.8 X |
| 4,581,925 | 4/1986 | Crutcher | 73/146.8 |
| 4,646,673 | 3/1987 | Fordyce | 137/227 X |
| 4,953,395 | 9/1990 | Jard | 73/146.8 |

*Primary Examiner*—Russell D. Stormer
*Attorney, Agent, or Firm*—Brooks, Haidt Haffner & Delahunty

[57] ABSTRACT

An automobile wheel cover able to display tire pressure includes an air pressure meter and a safety and leak-proof T-connector (referred to as T-connector), wherein the air pressure meter is installed in a position nearby the center of wheel cover, the T-connector being fixed on a holder on the perimeter of the wheel cover and able to act together with the wheel cover to engage with or desengage from the tire and composed of a tire connector, an air pressure meter connector and an air valve connector to communicate with each other. The tire connector is provided with a plunger therein and able to engage with the air valve of tube to admit the air in the tire into the T-connector, the air pressure meter connector being engaged with the air conduit of the air pressure meter. The structure of the air valve connector is the same as that of the air valve of the tire, a new air valve being formed when the tire connector is engaged with the air valve of the tire. Through the foregoing structure, the wheel cover can display the tire pressure at all times on under all-weather conditions and can also display the tire pressure when inflating or deflating the tire.

7 Claims, 3 Drawing Sheets

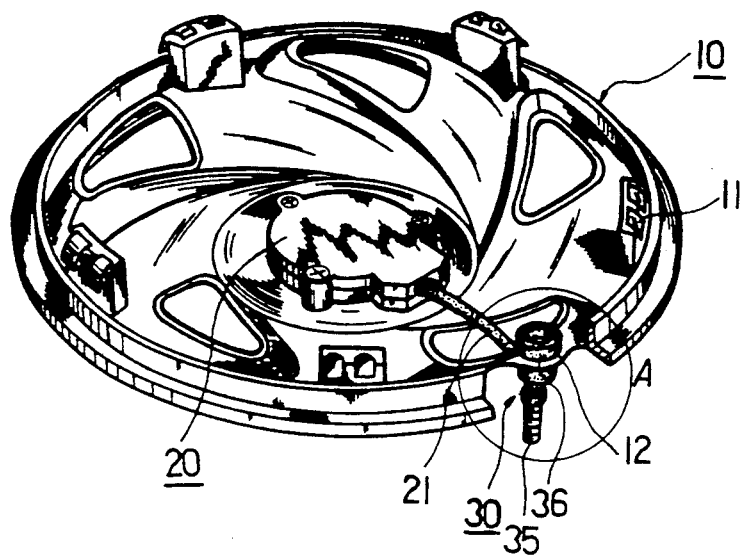
FIG. 1
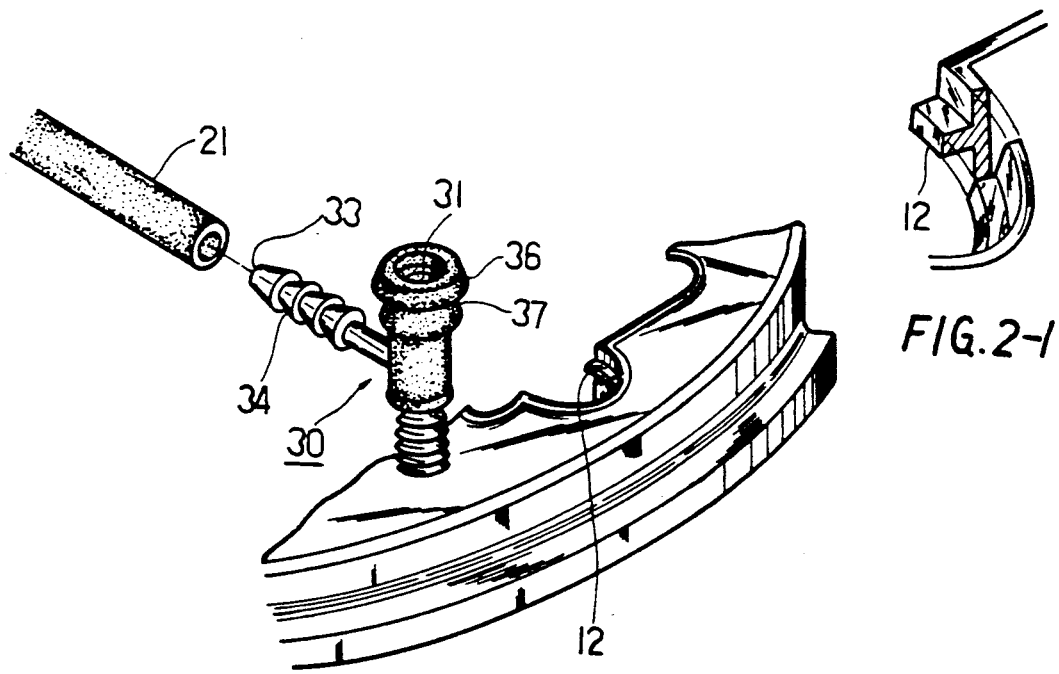
FIG. 2
FIG. 2-1

AUTOMOBILE WHEEL COVER ABLE TO DISPLAY TIRE PRESSURE

BACKGROUND OF THE INVENTION

The present invention relates to an automobile wheel cover able to display tire pressure, which can directly display the tire pressure at all times and under all weather conditions without the need to conduct any other test or to resort to any other pressure tester, thereby offering a convenient, practical and quick-and-easy-to-read automobile wheel cover as a novel product.

Since the tire supports the entire automobile weight and elastically and smoothly contacts the ground, the tire pressure has a considerable effect, directly or indirectly, on the safety of the vehicle, fuel consumption, passenger's comfort and tire wear rate and is, therefore, very important. Accordingly, each vehicle manufacturer prescribes its own standard tire pressure for the vehicles it produces, and the pressure is set forth in the operation manuals for its vehicles. In view of the above, the regulation of tire pressure of driving vehicles at a suitably standard pressure and the balance of the tire pressure become important items which have to be carefully emphasized to and be of concern to each vehicle driver.

At the present of time, there are a number of tire pressure testers for guaging tire pressure, their structures and types differing from each other but a majority of them operate in the following way: the tire pressure tester (guage or meter) is manually engaged with the tire air valve to test or guage the tire. This method of guaging tire pressure is extremely inconvenient because the tire pressure tester has to be brought with the user or carried on the vehicle at all times, and if the user fails to bring the tire pressure tester, the tire pressure cannot be guaged. In addition, it is rather troublesome to proceed with guaging tire pressure with conventional tire pressure testers. Each time pressure is to be measured the air valve cap of tube has to be removed, and then the tire pressure guage held to align it with and forcefully press down the air valve so that the air pressure in the tube is exposed to the air under pressure so that the tire pressure guage displays the tire pressure. Such an operation has to be repeated until the four or more tires are guaged. It is commonly known that such a process of pressure guaging is extremely inconvenient, troublesome and time-wasting, and the user's hands often come into contact with dirt, grease or the like on the tires or on the valves. Generally speaking most vehicle drivers dislike testing tire pressure and many serious traffic accident may be thus have resulted because drivers do not check tire pressures frequently enough.

SUMMARY OF THE INVENTION

In view of the foregoing drawbacks of conventional tire pressure testers, the present inventor who is a well-experienced vehicle driver and knows the inconvenience of carrying and using conventional tire pressure testers very well, has developed an automobile wheel cover able to display tire pressure through his research and experimentation. The present automobile wheel cover is provided with an air pressure meter and a safety and leakproof T-connector, one end of said connector communicating with the air valve of the tire, another end thereof being connected to the air pressure meter, and still another end thereof forming a new air valve. Therefore, the air pressure in the tire may be ushered or admitted into the air pressure meter installed on the wheel cover at any time. The driver can easily ascertain know and control the status of the tire pressure of his vehicle during all weather conditions and at all times, without relying on another guaging device or resorting to other inconvenient methods for guaging the tire pressure.

BRIEF DESCRIPTION OF THE DRAWINGS

FIG. 1 is a perspective view of the rear or inner side of one example of an automobile wheel cover able to display tire pressure in accordance with the present invention.

FIG. 2 is an enlarged breakdown view of Part A in FIG. 1.

FIG. 2-1 is an enlarged view of the holder 12 shown in FIG. 2, partially broken away to show the cross-section of the holder.

DETAILED DESCRIPTION OF THE PREFERRED EMBODIMENTS

Figure 3:
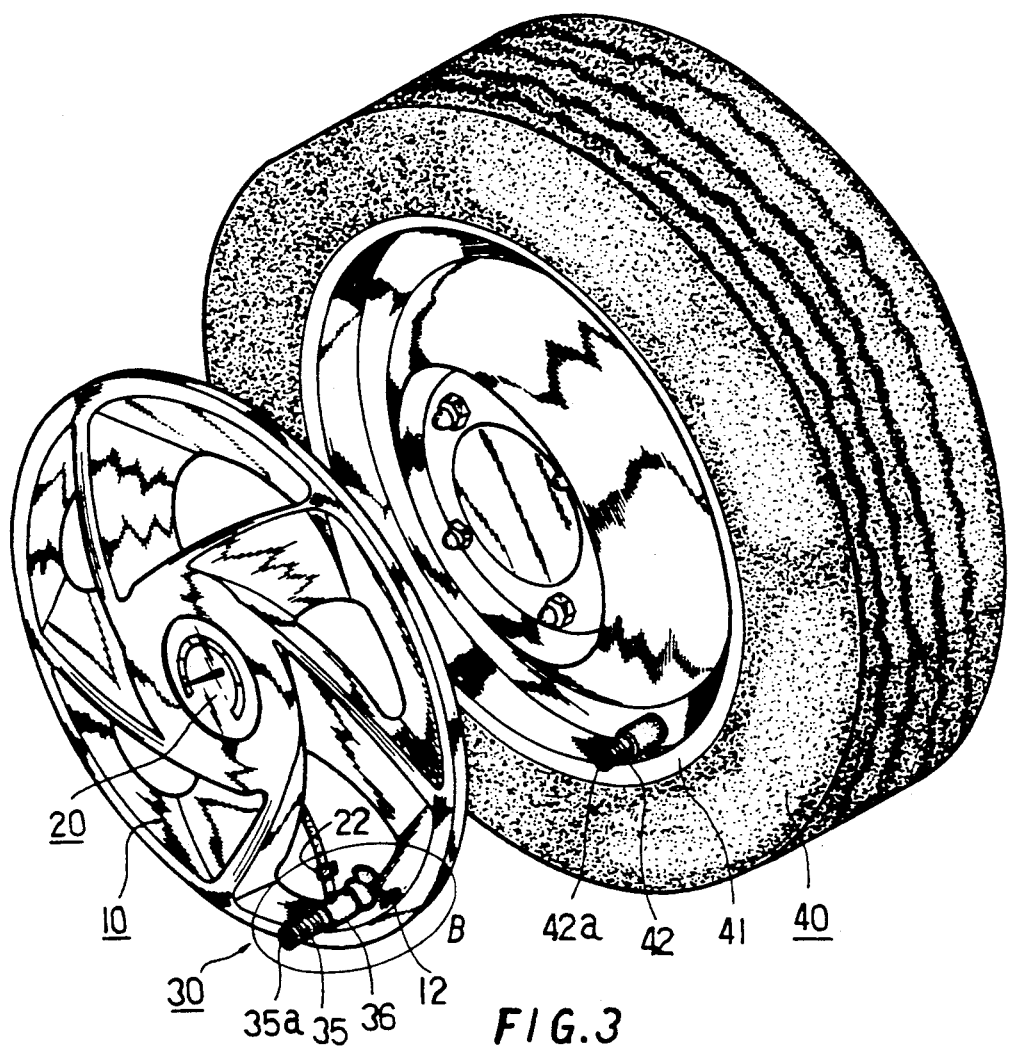
FIG. 3 is a perspective view of the front or outside of the automobile wheel cover shown in FIG. 1, which shows how the cover is arranged in relation to the tire.
Figure 4:
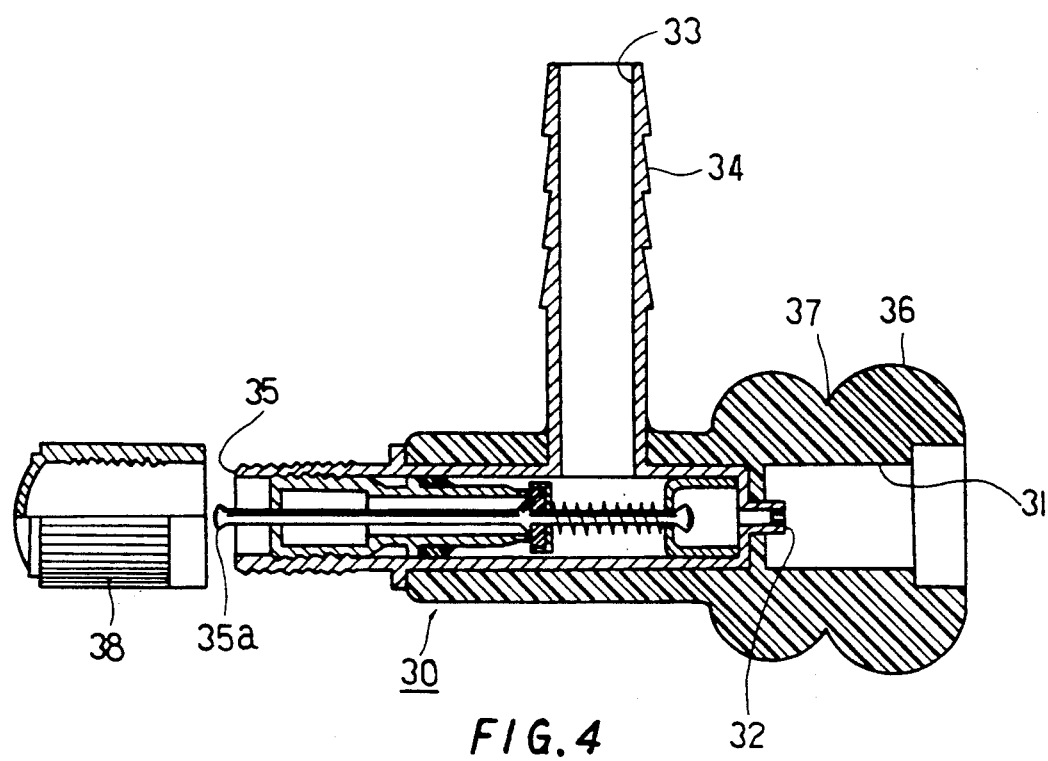
FIG. 4 is an enlarged sectional view of the T-connector of Part B in FIG. 3.

As shown in FIGS. 1 and 3, the present invention is for an automobile wheel cover 10 able to display tire pressure consisting of an air pressure meter 20 and a safety and leakproof T-connector 30 (referred to as "T-connector" hereinafter).

The wheel cover 10 is made of a molding material and has a shape and dimension to fit the wheel but is not limited to a certain model. A plurality of conventional fixing spring leaves 11 or other suitable fixing devices are provided about the perimeter of the wheel cover 10 so as to tightly fix the wheel cover 10 onto the rim 41 of tire 40.

The air pressure meter 20 may be installed in any position on the wheel cover 10 but it is most desirably installed in the center of wheel cover in order not to unbalance the tires.

As shown in FIGS. 1, 2, 3, and 4, the T-connector 30 is fixed onto a concave holder 12 on the perimeter of wheel cover 10 and consists of three connectors to communicate with each other, wherein a connector 31 (referred to as "tire connector" hereinafter) has a plunger 32 exposed to the air 42 in the tire 40 and usher or admit the air in the tire in the T-connector 30. Another connector 33 (referred to as "air pressure meter connector" hereinafter) has a plurality of overlapped annular check flanges 34. An air conduit 21 of the air pressure meter 20 can be tightly engaged with the air pressure meter connector 33 and then tightly clipped with a fixing ring 22 so as to tightly fix the air conduit 21 onto the connector 33. Still another connector 35 (reffered to as "air valve connector" hereinafter) has an inner structure which is the same as that of a conventional air valve 42 of the tire. Whether the air passage of the air valve connector 35 opens or not is controlled by the projecting valve lifter 35a subjected to the air pressure. When the wheel T-connector 30 is engaged with the air valve 42 of the tire 40, the air valve connector 35 forms a new air valve so far as the tire 40 is concerned.

An elastic coating 36 made of an elastic material such as rubber is provided to cover the tire connector 31 and has one or more concave necks 37 to receive and fix the concave holder 12 on the wheel cover 10. When the wheel cover 10 is engaged with the rim 41 of the tire 40, the T-connector 30 is also fixed by the holder 12, and the tire connector 31 tightly presses down and engages the air valve 42 of the tire 40 at the same time. When the wheel cover 10 is unexpectedly disengaged from the wheel during driving, the holder 12 can let the tire connector 31 disengage from the air valve 42 of the tire to let the wheel cover 10 disengage entirely from the wheel thereby avoid the air in the tire 40 from leaking out from the joint of the T-connector 30 or any other portion thereof and to prevent the wheel cover 10 from being continuously and sporadically towed, so it is not necessary to worry about the safety of driving the car, and that is why the T-connector 30 is called a safety and leakproof T-connector 30.

Figure 5:
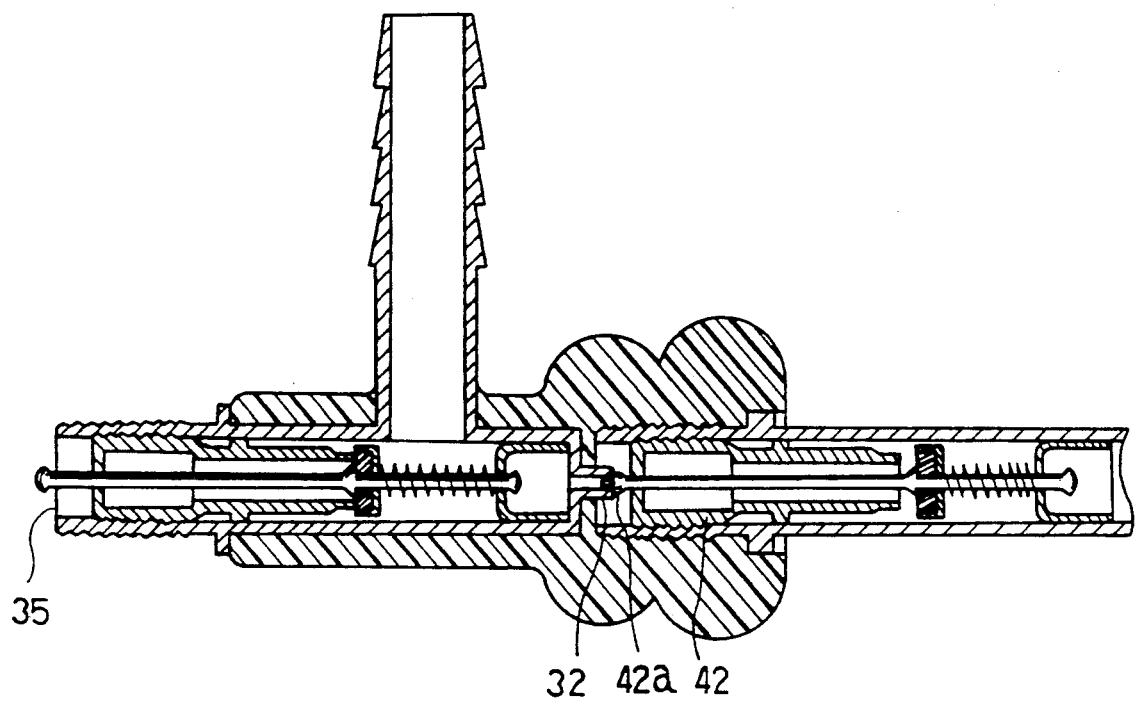
FIG. 5 is an assembly sectional view of the T-connector engaged with the air valve of the tube as shown in FIG. 3.

As shown in FIG. 5, when the T-connector 30 is engaged with the tire air valve 42, the plunger 32 in the tire connector 31 can be press the valve lifter 42a in the tire air valve 42 so that the air in the tire 40 can be ushered or directed into the air pressure meter 20 through the T-connector 30 and the tire presure can be displayed from time to time. When the foregoing tire connector 31 is engaged with the tire air valve 42, since the tire connector 31 is substantially formed with an elastic coating 36, and the inner wall (namely, the tire connector 31 of said elastic coating 36 generally conforms with the outer shape of tire air valve 42, and said elastic coating 36 is pressed by the holder 12 on the wheel cover 10, when the tire connector 31 is engaged with the tire air valve 42, there is an absolute air-tightness without any air leak.

Therefore, the valve connector 35 of the T-connector 30 forms a new air valve. Since the valve connector 35 and other two connectors 31, 33 are in fluid flow communication with each other, when inflating or deflating the tire through the valve connector 35, the air pressure meter 20 can display the tire pressure. The valve connector 35 may be covered with an enclosure or cap 38 when not to use it.

Figure 6:
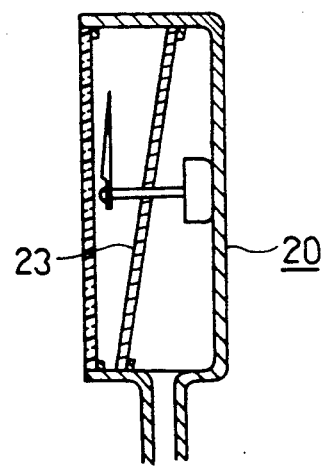
FIG. 6 is an optional sectional view of another example of an air pressure meter in accordance with the present invention.

As shown in FIG. 6, the scale panel 23 of the air pressuremeter 20 may be installed to be slightly inclined upward towards the user to conveniently allow inspection of the tire pressure in a natural field of view.

In addition, the pressure scale of the pressure meter 20 may be in different colors to indicate different pressure ranges so as to easily read the pressure levels. The pressure scale and pointer may be coated with a layer of luminous paint to make it easier for the user to inspect the tire pressure at night.

In view of the above, according to the present invention, the wheel cover can display the tire pressure at all times and under all-weather conditions without the need for carrying separate portable pressure testers, and when gaging the tire pressure, it is also not necessary to take any other pressure guaging actions or steps and the instant cover will never oil the user's hands, as with conventional pressure guaging devices used to carry out tire pressure measurements. Furthermore, according to the present invention, when inflating or deflating the tire, the air pressure meter on the wheel cover can display the tire pressure so that the driver or the people concerned can keep inflation or deflation up to a suitable standard tire pressure as scheduled from time to time. It is fool-proof that the present invention is extremely convenient and practical in reality.

I claim:

1. An automobile wheel cover for displaying air pressure in a tire, for use with a rim of an automobile tire having an air valve fixed on the rim, the wheel cover comprising an air pressure meter mounted in a substantially central position proximate to the center of the wheel cover; a T-connector fixed on a portion of the perimeter of the wheel cover, said T-connector comprising three connector portions arranged for fluid flow communication with each other, said three connector portions comprising a tire connector portion connectable with the tire air valve, an air pressure meter connector portion always in fluid flow communication with said tire connector portion, and an air valve connector portion configured and dimensioned to correspond to the air valve of the tire, thereby being capable of functioning like a tire air valve when filling the tire with air, said T-connector being provided with valve opening means for opening the tire air valve when said tire connector portion is connected to the tire air valve; and valve means in said air valve connector portion for selectively providing fluid flow communication between said air valve connector portion and said tire connector and air pressure meter connector portions when the tire is being inflated or deflated, and conduit means for connecting said air pressure meter and said air pressure meter connector portion in fluid flow communication to continuously transmit the air pressure in the tire to said air pressure meter, said T-connector being mounted on the wheel cover in a position substantially corresponding to the location of the air valve on the rim so that said T-connector and air valve can be juxtaposed when said wheel cover is mounted on the tire rim and said tire connector portion can be engaged with the air valve.

2. An automobile wheel cover as defined in claim 1, wherein said tire connector portion is dimensioned and configured to sealingly receive and mate with the tire air valve when juxtaposed therewith.

3. An automobile wheel cover as defined in claim 1, wherein said valve opening means comprises an axial plunger in said tire connector portion arranged to open the tire air valve and maintain it in an open condition when said tire connector portion cooperates with the tire air valve.

4. An automobile wheel cover as defined in claim 1, wherein said conduit means comprises a flexible hose and said air pressure meter connector portion is provided with means for retaining said flexible hose.

5. An automobile wheel cover as defined in claim 1, wherein said wheel cover is provided with a holder opening, said tire connector portion being provided on the outer surface thereof with an elastic coating receivable within said holder opening.

6. An automobile wheel cover as defined in claim 5, wherein said elastic coating is provided with at least one concave neck dimensioned to be received within said holder opening.

7. An automobile wheel cover as defined in claim 1, wherein said air pressure meter is slightly inclined in relation to the vertical direction when the wheel cover is mounted on the tire rim.

* * * * *